(12) United States Patent
Lee et al.

(10) Patent No.: US 10,684,590 B2
(45) Date of Patent: Jun. 16, 2020

(54) TIME INDICATOR

(71) Applicant: FINE SUNGWON PLUS CO., Ltd., Asan-si (KR)

(72) Inventors: Nam Hee Lee, Cheonan-si (KR); In Ok Kim, Osan-si (KR)

(73) Assignee: FINE SUNGWON PLUS CO., LTD., Asan-si (KR)

( * ) Notice: Subject to any disclaimer, the term of this patent is extended or adjusted under 35 U.S.C. 154(b) by 120 days.

(21) Appl. No.: 15/885,959

(22) Filed: Feb. 1, 2018

(65) Prior Publication Data

US 2018/0348708 A1    Dec. 6, 2018

(30) Foreign Application Priority Data

May 31, 2017 (KR) .................. 10-2017-0067636

(51) Int. Cl.
| | | |
|---|---|---|
| G04F 1/00 | (2006.01) | |
| G04F 13/06 | (2006.01) | |
| G04F 1/06 | (2006.01) | |
| G01K 11/12 | (2006.01) | |

(52) U.S. Cl.
CPC .................. *G04F 1/00* (2013.01); *G04F 1/06* (2013.01); *G04F 13/06* (2013.01); *G01K 11/12* (2013.01)

(58) Field of Classification Search
CPC ... G01K 11/12; G04F 1/00; G04F 1/02; G04F 1/06; G04F 13/06
See application file for complete search history.

(56) References Cited

U.S. PATENT DOCUMENTS

| | | | | |
|---|---|---|---|---|
| 4,408,557 A | * | 10/1983 | Bradley | G01K 3/04 368/327 |
| 4,432,656 A | * | 2/1984 | Allmendinger | G01K 3/04 116/206 |
| 5,317,987 A | * | 6/1994 | Muller | G04F 1/00 116/206 |
| 6,741,523 B1 | * | 5/2004 | Bommarito | G04F 1/00 368/327 |
| 6,968,804 B1 | * | 11/2005 | Barbieri | G01K 3/04 116/219 |
| 7,429,126 B2 | * | 9/2008 | Maschietti | G01K 11/06 116/217 |
| 2003/0214997 A1 | * | 11/2003 | Diekmann | G01K 3/04 374/102 |
| 2018/0259403 A1 | * | 9/2018 | Patel | G01K 11/12 |

FOREIGN PATENT DOCUMENTS

| | | |
|---|---|---|
| EP | 1405145 B1 | 8/2005 |
| JP | 2003-533706 A | 11/2003 |
| KR | 10-0900110 B1 | 6/2009 |
| WO | 03/007088 A2 | 1/2003 |

* cited by examiner

*Primary Examiner* — Daniel P Wicklund
(74) *Attorney, Agent, or Firm* — Korus Patent, LLC; Seong Il Jeong (57) ABSTRACT

The present invention relates to a time indicator, and more specifically to a time indicator which can indicate times in a multiple manner, thereby enabling a user to be aware of both an effective period and a period having elapsed after the effective period and to rapidly check whether the time indicator is operating.

8 Claims, 5 Drawing Sheets

TIME INDICATOR

BACKGROUND

1. Technical Field

The present invention relates to a time indicator, and more specifically to a time indicator which can indicate times in a multiple manner, thereby enabling a user to be aware of both an effective period and a period having elapsed after the effective period and to rapidly check whether the time indicator is operating.

2. Description of the Related Art

Products, such as food and a medicine, and various types of parts, such as an air filter for a vehicle, have effective periods which are suitable for the use thereof. Since such a product or part decays or does not appropriately perform its function after a predetermined period has elapsed from the time at which the product or part was manufactured or started to be used, it is necessary to accurately monitor the elapse of time from the time at which the product or part was manufactured or started to be used to current time.

For this purpose, various types of time indicators each having a predetermined time indication strip have been developed. As an example, there has been developed a time indicator in which a predetermined liquid moves in a predetermined layer and a period of use is determined based on the distance over which the liquid has moved in the layer.

However, this time indicator is problematic in that it can indicate only a single type of time, and thus it is possible to check only the elapse of a predetermined effective period. For example, in the case of a consumable product, such as a filter for a vehicle, a user does not frequently check the elapse of an effective period and a critical problem does not occur even when a predetermined period has elapsed after the effective period, and thus there are many cases where the consumable product continues to be used even when the effective period has elapsed.

Accordingly, when the user checks the time indicator attached to the filter for a vehicle, it is necessary for the user to be accurately aware of both a period which remains up to the end of the effective period and a period which has elapsed after the effective period. However, in the case of a time indicator in which an effective period has elapsed, it is difficult to be aware of a period which has elapsed after the effective period, and it is possible to check only whether the effective period has elapsed or not. In this case, the user can be aware of neither a period which has elapsed after the effective period nor possibility that a problem occurs. Furthermore, this may result in a problem, such as a failure of a vehicle, a failure of a part, the contamination of the inner space of the vehicle, or the like.

Furthermore, there are cases where it is difficult to rapidly determine whether the conventional time indicator started to operate.

Accordingly, there is a need for a time indicator which enables a user to be clearly aware of both a predetermined effective period and a period having elapsed after the effective period and to rapidly determine whether the time indicator is operating.

PRIOR ART DOCUMENT

[Patent Document]
Patent document 1: Korean Patent No. 10-0900110

SUMMARY

The present invention has been conceived to overcome the above-described problems, and an object of the present invention is to provide a time indicator which can indicate times in a multiple manner, thereby enabling a user to be aware of both an effective period and a period having elapsed after the effective period.

Another object of the present invention is to provide a time indicator which enables whether the time indicator is operating to be rapidly checked.

Still another object of the present invention is to provide a time indicator which enables whether a product is within or outside an effective period to be easily checked.

According to an aspect of the present invention, there is provided a time indicator, including: a plate-shaped base configured to have a predetermined area; a chamber provided on one side of the base, and configured to have an inner filling space and allow the filling space to be filled with ink; and strips formed inside the base, and configured to extend to predetermined lengths; wherein the front ends of the strips are connected to the chamber; wherein the chamber are configured such that the chamber has rupturable portions which are ruptured when external force is applied to the chamber and such that the ink inside the chamber flows into the strips through the rupturable portions when the rupturable portions are ruptured; and wherein the base has a window which is formed over the strips and has optical transparency such that the ink having flowed into the strips is visible from an outside.

The strips may include a first strip and a second strip, the chamber may include a first chamber and a second chamber, and the first strip may be connected to the first chamber and the second strip may be connected to the second chamber.

The first strip may be disposed over the second strip to overlap each other in a vertical direction; and the second strip may have a longer length than the first strip, and the second strip may extend longer than the first strip by a predetermined length.

The front ends of the first strip and the second strip may be located on the same identical line in a lengthwise direction.

The ink with which the first chamber is filled and the ink with which the second chamber is filled may have different colors.

The first strip may be configured to allow ink to enter and spread at a higher speed than the second strip.

The first strip may have a larger sectional area than the second strip.

The ink with which the first chamber is filled may have lower viscosity than the ink with which the second chamber is filled.

The chamber and the strips may be spaced apart from each other by a predetermined distance, and the base may be provided with flow paths which are formed between the front ends of the strips and the chamber, which connect the strips with the chamber, and which allow the ink inside the chamber to flow into the strips.

The window may extend over the flow paths such that that the ink inside the flow paths is visible from the outside.

The chamber may include: a chamber body formed in a predetermined three-dimensional shape, made of a material deformable by external force, and configured to have the filling space therein; and a partition configured to separate the filling space inside the chamber body into a first filling space and a second filling space; and the first filling space and the second filling space may form a first chamber and a second chamber, respectively, and the first chamber and the second chamber may be formed in an integrated manner inside the single chamber body.

The rupturable portions may include a first rupturable portion formed on the bottom of the first chamber and a second rupturable portion formed on the bottom of the second chamber.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Preferred embodiments according to the present invention will be described below with reference to the accompanying drawings.

Figure 1:
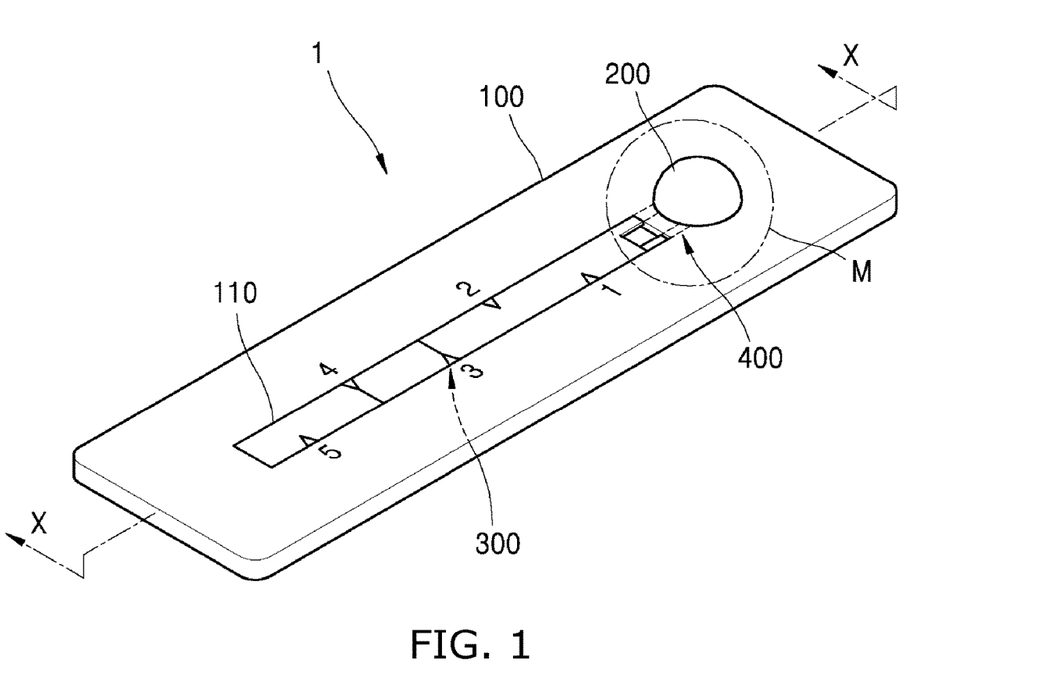
FIG. 1 is a view showing a time indicator according to an embodiment of the present invention.
Figure 2:
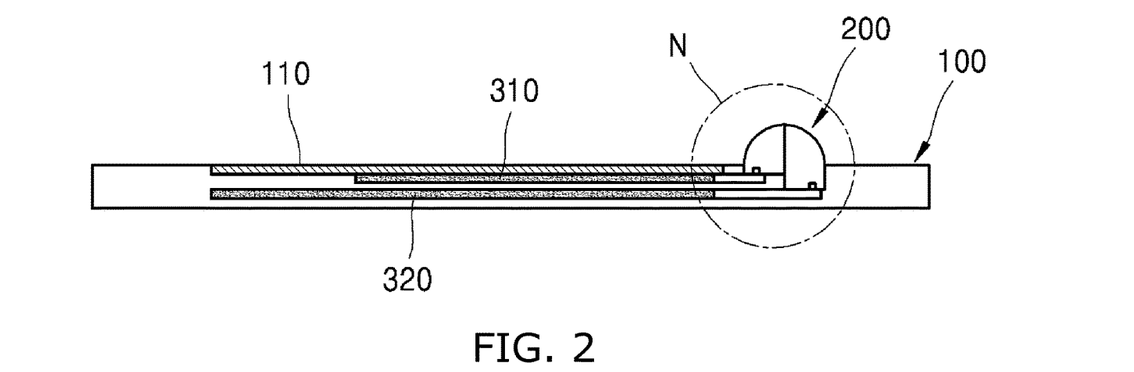
FIG. 2 is a sectional view taken along line X-X of FIG. 1.
Figure 3:
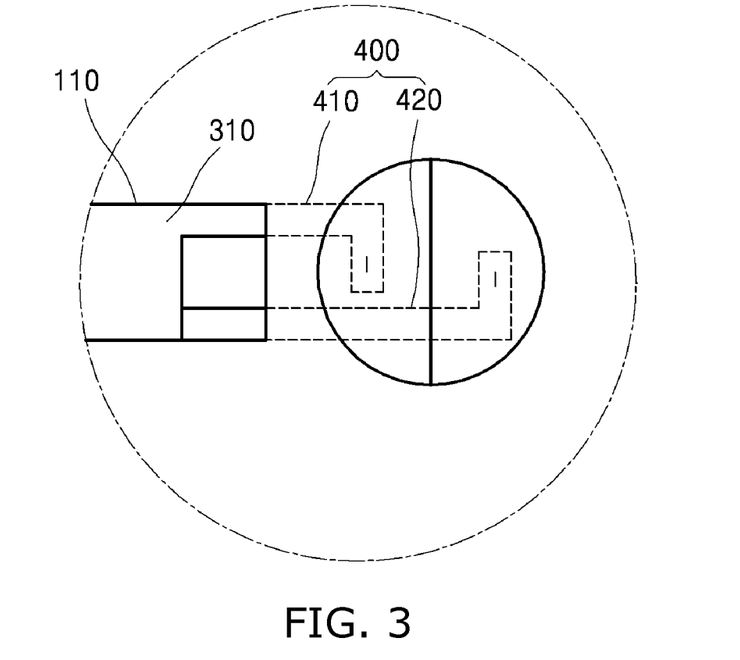
FIG. 3 is an enlarged view showing portion M of FIG. 1.
Figure 4:
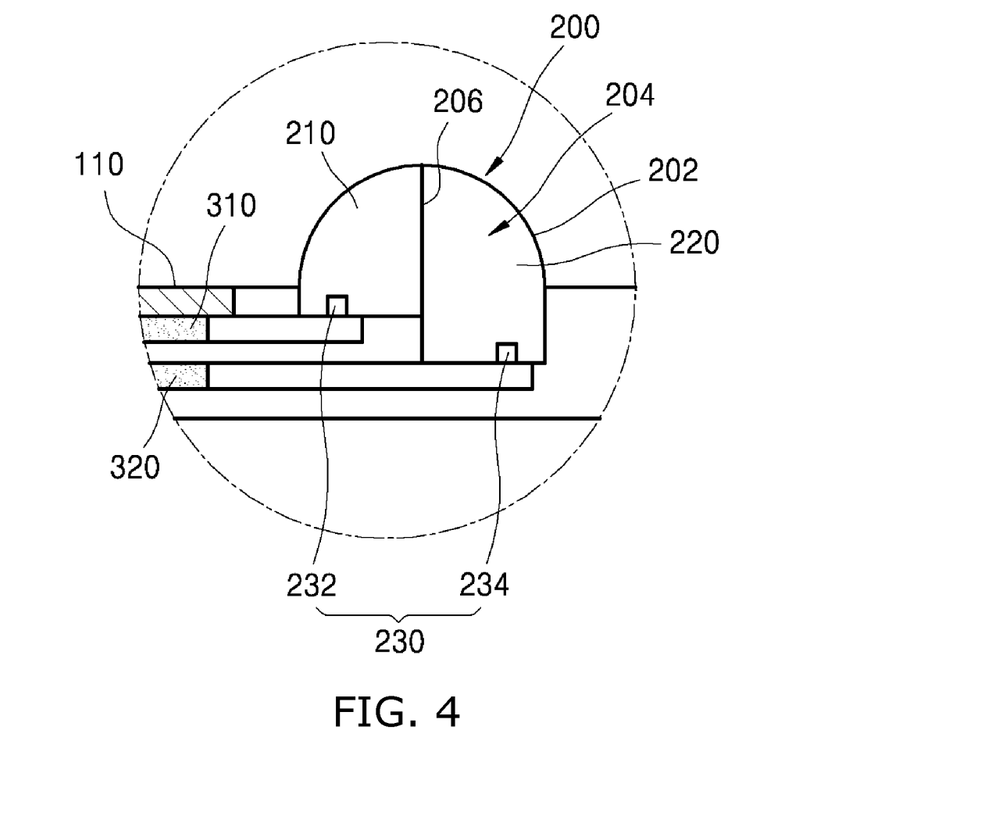
FIG. 4 is an enlarged view showing portion N of FIG. 2.

FIG. 1 is a view showing a time indicator 1 according to an embodiment of the present invention, FIG. 2 is a sectional view taken along line X-X of FIG. 1, FIG. 3 is an enlarged view showing portion M of FIG. 1, and FIG. 4 is an enlarged view showing portion N of FIG. 2.

The time indicator 1 according to the present invention may include a base 100, a chamber 200, strips 300, and flow paths 400.

The base 100 is formed of a plate-shaped member having a predetermined area, a predetermined thickness, and a predetermined length. Preferably, the base 100 is made of a material whose at least part has optical transparency, and may have a configuration in which plate-shaped members in each of which a predetermined depression or hole is formed are stacked on top of one another.

The base 100 includes a window 110. The window 110 is formed through the top or bottom surface of the base 100, and has optical transparency, thereby enabling the inside thereof to be viewed with the naked eye. The window 110 extends to a predetermined length. Although the window 110 preferably extends in the form of a rectilinear line, the window 110 is not necessarily limited thereto. The window 110 may be formed over the strips 300 and the flow paths 400 to be described later, and may be configured such that a user can visually check ink having entered into the strips 300 and the flow paths 400.

Furthermore, predetermined marks indicative of various types of time spans, such as times, days, months, etc., may be preferably provided on the portions of the base 100 beside the window 110. For example, as shown in FIG. 1, numbers ranging from 1 to 5 may be marked. It will be apparent that the marks are not necessarily limited to the numbers.

The chamber 200 may be provided on one side of the base 100 in the lengthwise direction of the base 100, and may be filled with ink. In this case, the ink is not necessarily limited to the ink which is commonly known. Any type of colored or colorless liquid material may be used as the ink as long as it has predetermined flowability and viscosity. The chamber 200 may be provided on the top surface of the base 100, and, thus, may be located on the same surface as the window 110 provided on the base 100. Alternatively, as in the case where the chamber 200 is located on the bottom surface of the base 100 and the window 110 is located on the top surface of the base 100, the chamber 200 and the window 110 may be located on different surfaces. However, the locations thereof are not limited thereto.

Furthermore, the chamber 200 may be separated from or integrated with the base 100. In other words, the chamber 200 may be configured in a form in which a portion of the base 100 is swollen to have a predetermined space. The method of configuring the chamber 200 is not limited to a specific method.

Preferably, the chamber 200 includes a chamber body 202, a filling space 204, a partition 206, and rupturable portions 230.

The chamber body 202 is formed of a sealed structure having a predetermined three-dimensional shape. The chamber body 202 may be made of a material which is deformable by external force so that a user can crush the chamber 202 by pressing the chamber 202 with a hand. Preferably, the chamber body 202 may have a hemispheric shape. Furthermore, the material of the chamber body 202 which is deformable by appropriate external force may be synthetic resin, thin plastic, or the like.

The filling space 204 may be formed within the chamber body 202. The filling space 204 may be filled with ink. As described above, the chamber 200 is configured to be deformable. Accordingly, when the chamber 200 is deformed, the volume of the filling space 204 may be reduced.

The partition 206 is provided inside the filling space 204, and separates the filling space 204. Preferably, although the partition 206 may separate the filling space 204 into two regions, the separation is not necessarily limited thereto.

The filling space 204 inside the chamber body 202 is separated by the partition 206, and is separated into a first filling space 204 and a second filling space 204. The first filling space 204 and the second filling space 204 may form a first chamber 210 and a second chamber 220, respectively. In other words, the first chamber 210 and the second chamber 220 may be formed by separating the filling space 204 within the one chamber body 202 by means of the partition 206, and may be configured within the one chamber body 202 in an integrated manner. Meanwhile, although the partition 206 is illustrated as separating the chamber 200 in a transverse direction in the drawings, the direction is not necessarily limited thereto. The partition 206 may separate the chamber 200 in a lateral direction, and may have various shapes. Furthermore, the partition 206 may be configured not to be ruptured or penetrated so that the ink inside the first chamber 210 and the ink inside the second chamber 220 can be prevented from being mixed together even when the chamber 200 is deformed by external force.

The rupturable portions 230 are formed on the bottom of the chamber 200, and are rupturable by external force. For example, the rupturable portions 230 may be each formed of a portion which is thinner than other portions. The rupturable portions 230 may include a plurality of portions. For example, a first rupturable portion 232 may be formed on the bottom of the first chamber 210, and a second rupturable portion 234 may be formed on the bottom of the second chamber 220. When the chamber 200 is subjected to external force, it is deformed, and thus the rupturable portions 230 may be ruptured. As the rupturable portions 230 are ruptured, the ink with which the filling space 204 is filled flows out. In this case, the partition 206 is configured not to be ruptured or penetrated as described above, and thus the ink with which the first chamber 210 is filled and the ink with which the second chamber 220 is filled are not mixed together.

Preferably, the ink with which the first chamber 210 is filled and the ink with which the second chamber 220 is filled may have different colors. For example, the first chamber 210 may be filled with blue ink, and the second chamber 220 may be filled with red ink.

Meanwhile, although the second chamber 220 is shown as having a larger depth than the first chamber 210 in a downward direction in the drawings, the depths of the first and second chambers 210 and 220 are not necessarily limited thereto.

The strips 300 may be each formed of a space which is formed inside the base 100 and which extends to a predetermined length.

According to an embodiment, the strips 300 may preferably include a first strip 310 and a second strip 320.

The first strip 310 may be formed of a space which has a predetermined vertical height, a predetermined lateral width, and a predetermined length and extends. Preferably, the first strip 310 may have a small vertical height which is suitable for the occurrence of a capillary phenomenon. Furthermore, the first strip 310 may preferably extend in the form of a rectilinear line. A front end of the first strip 310 may be located adjacent to the chamber 200, and may be spaced apart from the chamber 200 by a predetermined distance.

The second strip 320 may be formed of a space which has a vertical height, a lateral width, and a length and which extends, like the first strip 310. Furthermore, preferably, the second strip 320 may also have a small vertical height which is suitable for the occurrence of a capillary phenomenon. Moreover, the front end of the second strip 320 may be also located adjacent to the chamber 200, and may be spaced apart from the chamber 200 by a predetermined distance.

Preferably, the first strip 310 and the second strip 320 may have the same vertical height and the same lateral width so that ink entering into the first strip 310 and ink entering into the second strip 320 spread and move forward at the same speed. Preferably, the second strip 320 may have a longer length than the first strip 310. Furthermore, the front ends of the first strip 310 and the second strip 320 may be located along the same line in their lengthwise direction. In other words, the distance between the chamber 200 and the first strip 310 may be the same as the distance between the chamber 200 and the second strip 320 in a lengthwise direction. Accordingly, the back end of the second strip 320 extends longer than the back end of the first strip 310 by a predetermined length. In this case, the front end in the lengthwise direction refers to a portion which is adjacent to the chamber 200.

The second strip 320 may be located under the first strip 310. Furthermore, the overall first strip 310 and the overall second strip 320 may preferably have similar shapes. For example, as shown in the drawings, the first strip 310 and the second strip 320 may have shapes which extend along straight lines. As another example, when the first strip 310 has a curved shape, the second strip 320 also has a curved shape like the first strip 310. Accordingly, the first strip 310 and the second strip 320 may overlap each other in a vertical direction. However, the first strip 310 and the second strip 320 may be configured such that the internal spaces thereof are sealed and, thus, cannot exchange liquids with each other. As a result, at least part of the base 100 is formed between the first strip 310 and the second strip 320 like a barrier wall.

Although the insides of the first strip 310 and the second strip 320 have been described as being empty above, they are not limited thereto. For example, a predetermined member made of an appropriate material, such as paper, may be provided in the inside of each of the first strip 310 and the second strip 320 so that ink can spread throughout the inside.

The flow paths 400 are predetermined paths formed in the base 100, and may be formed of connection paths which connect the front ends of the strips 300 and the chamber 200 with each other.

The flow paths 400 may include a first flow path 410 and a second flow path 420. The first flow path 410 may connect the first chamber 210 and the first strip 310 with each other, and the second flow path 420 may connect the second chamber 220 and the second strip 320 with each other.

Preferably, the front end of the first flow path 410 may be connected beneath the first rupturable portion 232 of the first chamber 210, and the front end of the second flow path 420 may be connected beneath the second rupturable portion 234 of the second chamber 220. Accordingly, when the chamber 200 is subjected to external force and the first rupturable portion 232 and the second rupturable portion 234 are ruptured, the ink inside the chamber 200 may enter into the first flow path 410 and the second flow path 420 through the first rupturable portion 232 and the second rupturable portion 234.

Furthermore, the back end of the first flow path 410 may be connected to one side of the front end of the first strip 310, and the back end of the second flow path 420 may be connected to the other side of the front end of the second strip 320. For example, as shown in the drawing, the first flow path 410 and the second flow path 420 may be respectively disposed on one side and the other side in a lateral direction, and may be disposed not to overlap each other in a vertical direction.

Preferably, the first flow path 410 and the second flow path 420 may have appropriate internal volumes such that ink can rapidly flow into the first flow path 410 and the second flow path 420 when the chamber 200 is subjected to external force and the ink inside the chamber 200 flows out. In other words, in order to allow the ink to enter into the flow paths 400 through the rupturable portions 230 when the ink inside the chamber 200 flows out, the flow paths 400 may be configured to allow the ink to flow rapidly regardless of its viscosity. For this purpose, the flow paths 400 may have various structures, for example, in such a way that they are formed of capillary tubes or have large volumes.

Furthermore, as described above, the window 110 formed in the base 100 may be formed over the tops of the strips 300 and the flow paths 400. Accordingly, as shown in the drawings, when the strips 300 are formed in the shaped of rectilinear lines, the window 110 may be formed in the shape of a rectilinear line like the strips 300. In this case, the back end of the window 110 may be disposed at the same location as the back end of the strips 300, and the front end of the window 110 extends longer than the front ends of the strips 300 up to at least parts of the flow paths 400. Accordingly, when the ink inside the chamber 200 flows out and enters into the flow paths 400, a user can check whether ink has flowed into the flow paths 400 with a naked eye through the window 110 formed in the base 100. Accordingly, the user can check whether the chamber 200 has been normally ruptured by external force.

Figure 5:
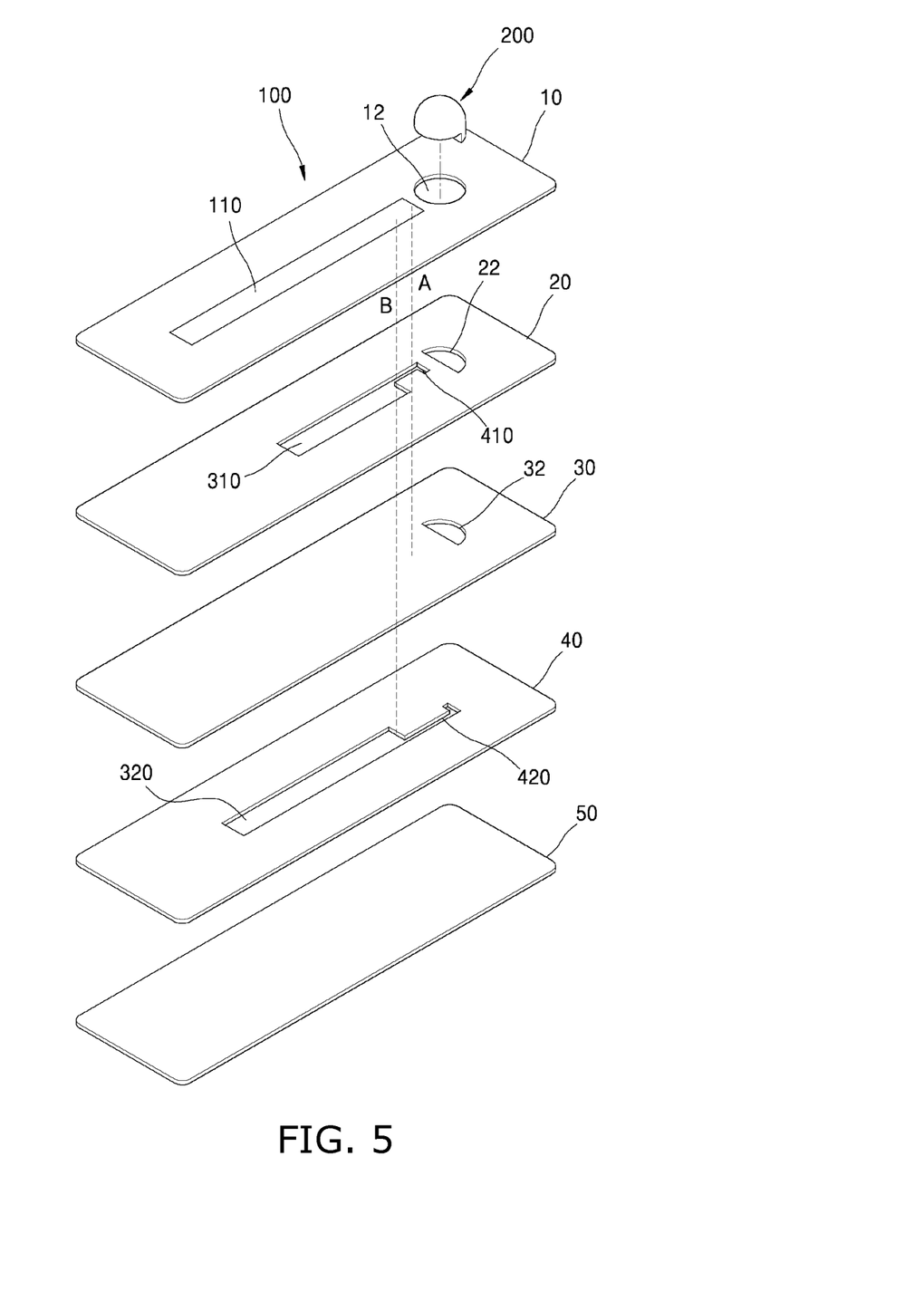
FIG. 5 is an exploded perspective view showing a time indicator according to an embodiment of the present invention.

FIG. 5 is an exploded perspective view showing a time indicator 1 according to an embodiment of the present invention. However, the time indicator according to the present invention is not necessarily limited to a structure shown in FIG. 5, and FIG. 5 illustrates an example of the time indicator according to the present invention.

The base 100 of the time indicator 1 according to the present embodiment may include a plurality of plate-shaped bodies each having a thin thickness. The plate-shaped bodies may include a first body 10, a second body 20, a third body 30, a fourth body 40, and a fifth body 50 sequentially from the top thereof.

The first body 10 forms the top surface of the base 100. A window 110 is formed in the first body 10. In an example, a first hole 12 into which a chamber 200 can be fitted may be formed in the first body 10. Meanwhile, the chamber 200 and the base 100 may be integrated with each other.

A first strip 310 and a first flow path 410 are formed in the second body 20. The front end of the first flow path 410 is located beneath the bottom of a first chamber 210. Furthermore, the first strip 310 is located under the window 110. Furthermore, a second hole 22 configured such that the second chamber 220 of the chamber 200 can be passed therethrough may be formed in front of the first flow path 410.

A third hole 32 configured such that the second chamber 220 of the chamber 200 can be passed therethrough is formed in the third body 30. The third body 30 may serve as a wall portion which separates the first strip 310 and the second strip 320 from each other.

A second strip 320 and a second flow path 420 are formed in the fourth body 40. The front end of the second flow path 420 is located beneath the bottom of the second chamber 220. The second chamber 220 is brought into contact with the front end of the second flow path 420 through the second hole 22 and the third hole 32.

The fifth body 50 is located beneath the fourth body 40, and forms the bottom of the base 100. Meanwhile, an adhesive, such as transparent double-sided tape or the like, may be preferably applied onto the bottom surface of the fifth body 50. Accordingly, the time indicator according to the present invention may be attached to another place.

Preferably, the second body 20 and the third body 30 may each include a material having optical transparency. Accordingly, ink inside the second strip 320 and the second flow path 420 may be viewed from the outside through the second body 20, the third body 30, and the window 110 of the first body 10. Alternatively, the first body 10 may be also made of a material having optical transparency, and the portion other than the window 110 may be covered with a predetermined cover, a sticker, or the like.

Furthermore, as described above, the front end of the first strip 310 and the front end of the second strip 320 may be located along the same line, as indicated by "B". The window 110 may extend longer than the front end of the first strip 310 and the second strip 320 up to at least parts of the first flow path 410 and the second flow path 420, as indicated by "A."

In this case, the back end of the window 110 may be disposed at the same location as the back end of the strips 300, and the front end of the window 110 extends longer than the front ends of the strips 300 up to at least parts of the flow paths 400.

Figure 6:
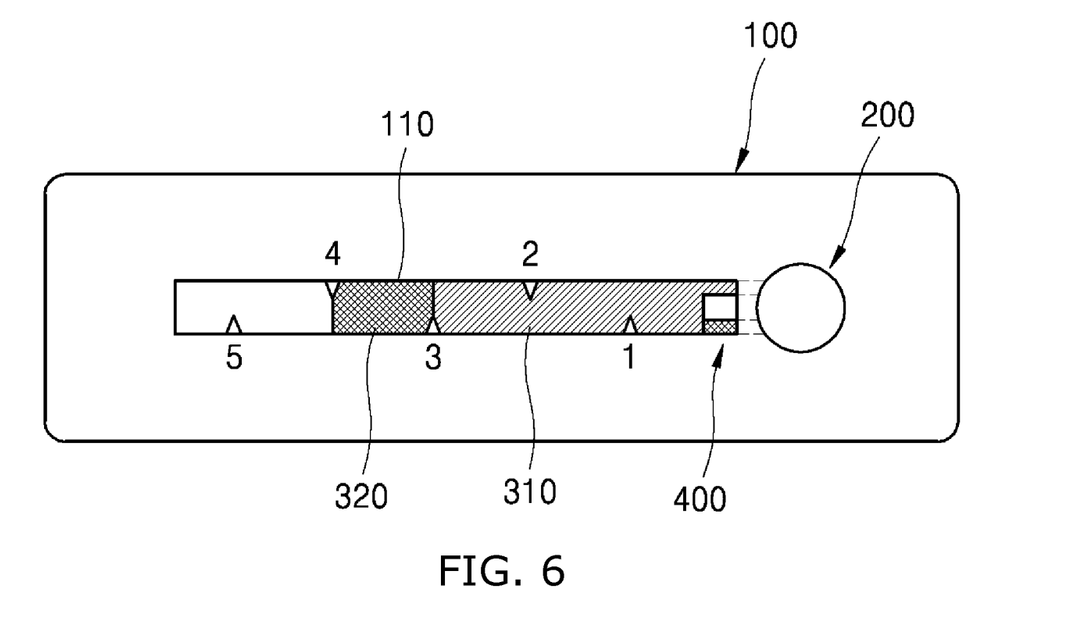
FIG. 6 is a view showing the usage state of a time indicator according to an embodiment of the present invention.

FIG. 6 is a view showing the usage state of the time indicator 1 according to an embodiment of the present invention. The operation of the time indicator 1 according to the present invention will be described below.

When a user applies pressure on the chamber 200 by pressing it, the rupturable portions 230 provided in the chamber 200 are ruptured. When the rupturable portions 230 are ruptured, the ink with which the chamber 200 has been filled flows out through the flow paths 400 which are connected to the rupturable portions 230. In this case, the ink with which the first chamber 210 has been filled flows into the first flow path 410, and the ink with which the second chamber 220 has been filled flows into the second flow path 420. In this case, as described above, the flow paths 400 have appropriate volumes, and thus the ink inside the chamber 200 can immediately flow into the flow paths 400. Furthermore, the window 110 formed in the base 100 extends over the first flow path 410 and the second flow path 420, and thus it can be immediately checked whether the ink inside the chamber 200 has entered into the flow paths 400. Accordingly, it can be rapidly checked whether the ink inside the chamber 200 has flowed out and the time indicator 1 has started an appropriate operation.

As described above, since the flow paths 400 are connected to the strips 300 and the strips 300 have structures suitable for the occurrence of a capillary phenomenon, the ink having flowed out into the flow paths 400 enters into the strips 300. Accordingly, the ink having flowed into the first flow path 410 enters into the first strip 310, and the ink having flowed into the second flow path 420 enters into the second strip 320.

When the ink has entered into the strips 300 as described above, the ink inside the strips 300 can be viewed through the window 110 formed in the base 100, and thus a period from an operation time to a current time can be determined based on the lengths of the ink having entering into the strips 300.

In this case, the front ends of the first strip 310 and the second strip 320 are located along the same line, and thus the time at which the ink enters into the first strip 310 and the time at which the ink enters into the second strip 320 may be the same.

Furthermore, the first strip 310 is located over the second strip 320, the ink inside the second strip 320 is covered with the ink inside the first strip 310 until the ink enters into the back end of the first strip 310. However, after the ink has reached the back end of the first strip 310, the ink inside the second strip 320 located at the back end of the first strip 310 is viewed. Accordingly, the elapse of time from the final time of the first strip 310 can be determined.

In accordance with the time indicator 1 according to the present invention, time indication can be performed in a dual manner. In other words, the time indication via the first strip 310 and the time indication via the second strip 320 are separately performed. The elapse of time from the final time of the first strip 310 can be determined via the second strip 320.

Accordingly, for example, an appropriate effective period and the elapse of time from the effective period may be indicated. For example, when the time indicator 1 according to the present invention is installed in a predetermined filter for a vehicle and the corresponding filter for a vehicle has an effective period of about three months, the first strip 310 may be allowed to have a length indicative of a period of three months, and the second strip 320 may be allowed to have a length indicative of a period of 5 months. Accordingly, time indication via the first strip 310 is available for first 3 months, and the elapse of time from the first three months, i.e., the effective period, can be determined via the second strip 320 after the first three months. As a result, a user can be clearly aware of the extent of the elapse of time from the effective period, and, thus, can rapidly determine whether to replace the filter for a vehicle.

In particular, as described above, when the first chamber 210 is filled with blue ink and the second chamber 220 is filled with red ink, the red ink can be viewed behind the back end of the blue ink after the elapse of three months from the start of use, and thus a user can clearly aware of the elapse of the effective period via the red ink.

Furthermore, since the time indicator 1 according to the present invention has the flow paths 400 and the window 110 provided in the base 100 extends over at least parts of the flow paths 400, it can be immediately checked whether ink has flowed out of the chamber 200. Accordingly, it can be rapidly checked whether the time indicator 1 has appropriately operated. Furthermore, since the flow paths 400 include the first flow path 410 and the second flow path 420 and the first flow path 410 and the second flow path 420 are located without an overlap, it can be clearly checked whether both ink inside the first chamber 210 and ink inside the second chamber 220 have flowed out.

Furthermore, the chamber 200 has the one chamber body 202 and the partition 206 configured to partition the filling space 204 inside the chamber body 202, and thus the first chamber 210 and the second chamber 220 configured to contain different types of ink are integrated into a single body. Accordingly, a user can simultaneously operate the first chamber 210 and the second chamber 220 by rupturing the first rupturable portion 232 and the second rupturable portion 234 through a single manipulation without a need to separately operate individual chambers 200.

Although only the case where the time indicator 1 is used for a filter for a vehicle has been described above, it will be apparent that the present invention is not necessarily limited thereto.

A time indicator according to a second embodiment of the present invention will be described below.

The time indicator according to the second embodiment of the present invention includes a base 100, a chamber 200, strips 300, and flow paths 400, as described in conjunction with the first embodiment. The structures of the base 100, the chamber 200, the strips 300, and the flow paths 400 are substantially the same as those described in conjunction with the first embodiment, whereas the structure of the first strip 310 is different from that of the first embodiment.

The first strip 310 of the time indicator according to the second embodiment of the present invention is configured to be rapidly filled with ink when the ink flows from the first chamber 210. In other words, although the first strip 310 is configured such that the length of entered ink increases with the elapse of time in the first embodiment, the overall first strip 310 is filled with ink having flowed out of the first chamber 210 immediately after the ink has flowed out of the first chamber 210 in the second embodiment. In this case, the term "immediately" is not limited to a case where there is no time interval, but also includes a case where there is a time interval of about 1 to 2 minutes.

Accordingly, the first strip 310 may have a vertical height which is suitable for rapid filling with ink. For example, the first strip 310 may have a larger sectional area than the second strip 320. Alternatively, the first strip 310 may have a different configuration.

Alternatively, the ink with which the first chamber 210 is filled may have appropriately low viscosity and high flowability which are suitable for the rapid entry of the ink into the first strip 310. Accordingly, the ink with which the first chamber 210 is filled may have lower viscosity than the ink with which the second chamber 220 is filled.

It will be apparent that it is possible for the first strip 310 to have a larger vertical height than the second strip 320 and for the ink inside the first chamber 210 to have lower viscosity than the ink inside the second chamber 220.

The second strip 320 has a small vertical height which is suitable for the occurrence of a capillary phenomenon, as in the first embodiment. Accordingly, as in first embodiment, the ink flows through the second strip 320 with the elapse of time.

In accordance with the time indicator according to the second embodiment, as the ink inside the chamber 200 flows out, the inside of the first strip 310 is rapidly filled with the ink. Accordingly, only the ink inside the first strip 310 can be viewed until the ink having entered into the second strip 320 passes through the back end of the first strip 310. In other words, within an effective or valid period indicated by the first strip 310, the ink inside the second strip 320 is covered with the ink inside the first strip 310, and thus only the ink with which the first strip 310 has been filled is viewed. When the effective or valid period has elapsed over time, ink having entered into the second strip 320 extends behind the first strip 310. Accordingly, a period which has elapsed after the effective or valid period can be conveniently determined.

Accordingly, only the ink inside the first strip 310 can be viewed within the effective or valid period, and the ink inside the second strip 320 can be viewed after the effective or valid period, with the result that whether a current time falls within the effective or valid period and how much period has elapsed after the effective or valid period can be clearly checked.

In accordance with the time indicator according to the present invention, times are indicated in a multiple manner, and thus a user can be aware of the period for which a product to which the time indicator was attached has been used and can be also aware of a period having elapsed after an effective period when the effective period elapsed. Accordingly, when a user views a part or the like on which the time indicator according to the present invention is installed, he or she can be accurately aware of possibility that a problem occurs and a need for the replacement of the part or the like, and can determine whether to replace the part or the like.

Although the preferred embodiments have been illustrated and described above, the present invention is not limited to the above-described specific embodiments. It will be apparent to a person having ordinary knowledge in the art to which the present invention pertains that various modifications and alterations may be made without departing from the gist of the present invention claimed in the attached claims. These modifications and alterations should be construed as falling within the scope of the present invention.

What is claimed is:
1. A time indicator, comprising:
a plate-shaped base configured to have a predetermined area;
a chamber provided on one side of the base, and configured to have an inner filling space and allow the filling space to be filled with ink; and
strips formed inside the base, and configured to extend to predetermined lengths;
wherein front ends of the strips are connected to the chamber;
wherein the chamber is configured such that the chamber has rupturable portions which are ruptured when external force is applied to the chamber and such that the ink inside the chamber flows into the strips through the rupturable portions when the rupturable portions are ruptured;

wherein the base has a window which is formed over the strips and has optical transparency such that the ink having flowed into the strips is visible from an outside;

wherein the chamber comprises:

a chamber body formed in a predetermined three-dimensional shape, made of a material deformable by external force, and configured to have the filling space therein; and a partition configured to separate the filling space inside the chamber body into a first filling space and a second filling space;

wherein the first filling space and the second filling space form a first chamber and a second chamber, respectively, and the first chamber and the second chamber are formed in an integrated manner inside the chamber body;

wherein the rupturable portions comprise a first rupturable portion formed on a bottom of the first chamber and a second rupturable portion formed on a bottom of the second chamber, and the first rupturable portion and the second rupturable portion are simultaneously ruptured and thus the first chamber and the second chamber are simultaneously operated;

wherein the strips comprise a first strip and a second strip, and the first strip is connected to the first chamber and the second strip is connected to the second chamber;

wherein the first strip is disposed over the second strip to overlap each other in a vertical direction; and wherein the second strip has a longer length than the first strip, and the second strip extends longer than the first strip by a predetermined length.

2. The time indicator of claim 1, wherein front ends of the first strip and the second strip are located on an identical line in a lengthwise direction.

3. The time indicator of claim 1, wherein the ink with which the first chamber is filled and the ink with which the second chamber is filled have different colors.

4. The time indicator of claim 1, wherein the first strip is configured to allow ink to enter and spread at a higher speed than the second strip.

5. The time indicator of claim 4, wherein the first strip has a larger sectional area than the second strip.

6. The time indicator of claim 4, wherein the ink with which the first chamber is filled has lower viscosity than the ink with which the second chamber is filled.

7. The time indicator of claim 1, wherein the chamber and the strips are spaced apart from each other by a predetermined distance, and the base is provided with flow paths which are formed between the front ends of the strips and the chamber, which connect the strips with the chamber, and which allow the ink inside the chamber to flow into the strips.

8. The time indicator of claim 7, wherein the window extends over the flow paths such that that the ink inside the flow paths is visible from the outside.

* * * * *